US006522167B1

(12) United States Patent
Ansari et al.

(10) Patent No.: US 6,522,167 B1
(45) Date of Patent: Feb. 18, 2003

(54) USER CONFIGURABLE ON-CHIP MEMORY SYSTEM

(75) Inventors: Ahmad R. Ansari, San Jose; Stephen M. Douglass, Saratoga; Mehul R. Vashi, San Jose, all of CA (US); Steven P. Young, Boulder, CO (US)

(73) Assignee: Xilinx, Inc., San Jose, CA (US)

( * ) Notice: Subject to any disclaimer, the term of this patent is extended or adjusted under 35 U.S.C. 154(b) by 82 days.

(21) Appl. No.: 09/757,760

(22) Filed: Jan. 9, 2001

(51) Int. Cl.[7] ........................ G06F 7/38; H03K 19/173
(52) U.S. Cl. ........................ 326/39; 326/46; 326/47; 326/40
(58) Field of Search ........................ 326/37, 38, 39, 326/40, 41, 46, 47

(56) References Cited

U.S. PATENT DOCUMENTS

| | | |
|---|---|---|
| 5,361,373 A | 11/1994 | Gilson |
| 5,537,601 A | 7/1996 | Kimura et al. |
| 5,652,904 A | 7/1997 | Trimberger |
| 5,671,355 A | 9/1997 | Collins |
| 5,752,035 A | 5/1998 | Trimberger |
| 5,914,616 A | 6/1999 | Young et al. |
| 5,914,902 A * | 6/1999 | Lawrence et al. |
| 5,933,023 A | 8/1999 | Young |
| 5,970,254 A | 10/1999 | Cooke et al. |
| 6,011,407 A * | 1/2000 | New ........................ 326/39 |
| 6,020,755 A | 2/2000 | Andrews et al. |
| 6,096,091 A | 8/2000 | Hartmann |
| 6,279,045 B1 | 8/2001 | Muthujumaraswathy et al. |
| 6,282,627 B1 | 8/2001 | Wong et al. |
| 6,343,207 B1 | 1/2002 | Hessel et al. |

OTHER PUBLICATIONS

The Programmable Logic Data Book, 1999, available from Xilinx, Inc., 2100 Logic Drive, San Jose, California 95124, Chapter 3, pp. 3–1 through 3–50.
The Programmable Logic Data Book, 2000, available from Xilinx, Inc., 2100 Logic Drive, San Jose, California 95124, Chapter 3, pp. 3–1 through 3–117.
Cary D. Snyder and Max Baron; "Xilinx's A–to–Z System Platform"; Cahners Microprocessor; The Insider's Guide to Microprocessor Hardware; Microdesign Resources; Feb. 6, 2001, pp. 1–5.

* cited by examiner

Primary Examiner—Michael Tokar
Assistant Examiner—Daniel D. Chang
(74) Attorney, Agent, or Firm—H. C. Chan

(57) ABSTRACT

A data processing system having a user configurable memory controller, one or more block RAMS, and a processor core can be configured in a single field programmable gate array (FPGA). The address depth of the block RAMs and the number of wait states can be selected by a user, and they can be set either prior to configuration of the FPGA or programmed using instructions of the processor core. An algorithm that can optimize the address depth and the number of wait states to achieve a performance level is also disclosed. The present invention can be applied to designs having separate instruction and data sides.

25 Claims, 7 Drawing Sheets

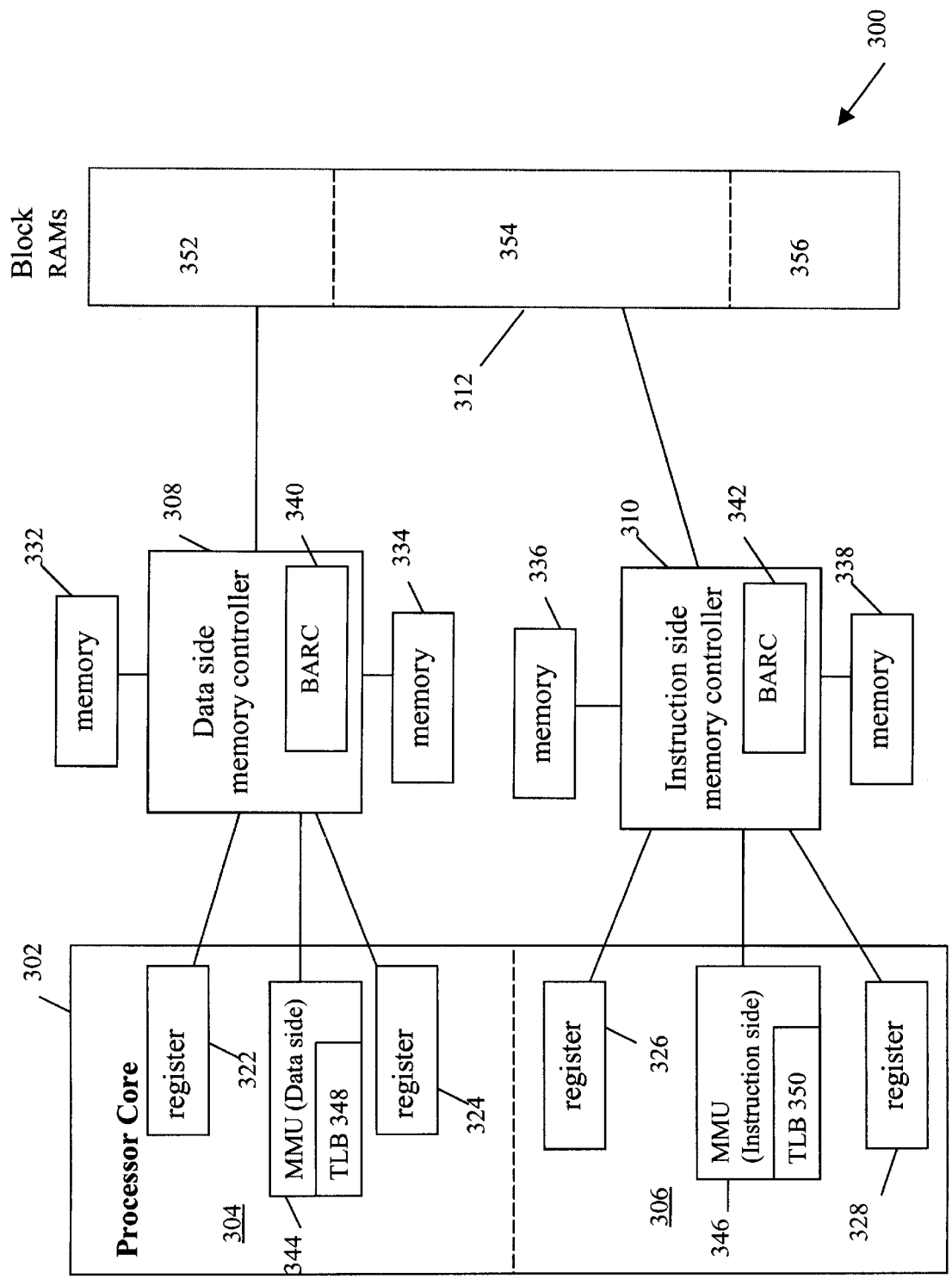

USER CONFIGURABLE ON-CHIP MEMORY SYSTEM

FIELD OF THE INVENTION

The present invention generally relates to memory system design, and more particularly to a memory system that can be configured by users to optimize the size and performance of the memory system.

BACKGROUND OF THE INVENTION

Programmable integrated circuits (ICs) are a well-known type of integrated circuit that may be programmed by a user to perform specified logic functions. One type of programmable IC, the field programmable gate array (FPGA), is very popular because of a superior combination of capacity, flexibility and cost. A FPGA typically includes an array of configurable logic blocks (CLBs) surrounded by a ring of programmable input/output blocks (IOBs). The CLBs and IOBs are interconnected by a programmable interconnect structure. The CLBS, IOBs, and interconnect structure are typically programmed by loading a stream of configuration data (bitstream) into internal configuration memory cells that define how the CLBs, IOBs, and interconnect structure are configured. The configuration bitstream may be read from an external memory (e.g., an external PROM). The collective states of the individual memory cells then determine the function of the FPGA.

As processing technology improves, more and more CLBs, IOBs and interconnect structures can be fabricated inside a FPGA. Recently, it is possible to build an entire data processing system (containing a central processor unit, memory, and various controllers) inside a FPGA. In some cases, not all the CLBs, IOBs and interconnect structures in the FPGA are used for building the data processing system, and some of them can be used for other applications.

One of the most important resources in a data processing system is memory. Many FPGAs provide blocks of random access memories (RAMs) each has thousands of memory cells ("block RAMs"). These blocks can be organized into different configurations. As example, a block RAM may have a capacity of 16 Kilobits. This block RAM may be arranged by a user to have an address depth of either 16K, 8K, 4K, 2K, 1K and 0.5K, with the corresponding number of bits per address as 1, 2, 4, 8, 16 or 32, respectively. A user can also combine a number of blocks to increase the total size of a memory system. More information about block RAMs can be found in U.S. Pat. No. 5,933,023 entitled "FPGA Architecture Having RAM Blocks with Programmable Word Length and Width and Dedicated Address and Data Lines," assigned to the assignee of the present application. This patent is incorporated herein by reference.

In general, a data processing system would like to have as much memory as possible. One of the reasons is that some software modules require a minimum amount of memory to run. Another reason is that it is sometimes possible to speed up computation by allocating more memory to a task. On the other hand, a large amount of memory requires a large number of block RAMs. With the addition of each block RAM, the memory data access time of the memory is lengthened. One way to solve this problem is to introduce delays between a request for memory access and the granting of the access. In other words, wait states need to be inserted. As a result, the overall performance of the data processing system is reduced.

Another problem with a large amount of memory is that the total amount of block RAMs in a FPGA is limited. In addition to the data processing system, other logic modules in the FPGA may wish to have more memory. If all or most of the block RAMs are allocated to the data processing system, it may compromise the design of other logic modules.

The optimal amount of memory and number of wait states vary with different designs. For example, real-time applications tend to require fast execution because the data processing system has to complete computations within a short period of time. Thus, it is desirable to eliminate wait states. On the other hand, a general purpose design may wish to run many software applications. Thus, it would be advantageous to include more memory in the data processing system. In order to give users the most design flexibility, it is desirable to allow the users to configure the memory system to achieve an optimal performance.

SUMMARY OF THE INVENTION

The present invention provides an on-chip data processing system comprising a user configurable on-chip memory system and an on-chip processor core. The memory system comprises one or more memory controllers, one or more block RAMs, and storage of design values related to the memory system. The number of block RAMs and the number of address lines (i.e., address depth) associated with the block RAMs can be selected and configured by users. One advantage of this invention is that only the necessary amount of block RAMs used by the processor core is allocated to the data processing system. All the block RAMs that are not allocated can be used by other on-chip applications. As a result, it optimizes the use of a valuable resource: block RAMs.

In one embodiment of the present invention, the memory controller contains an address manager that can deactivate some of the address lines originated from the processor core. The number of deactivated address lines is user configurable. The deactivation may be accomplished by a combination of demultiplexers, multiplexers and memory cells that store user supplied information.

Users can apply the memory controller of the present invention to set up the number of wait states of the memory system. In order to make sure that the memory system functions properly, the number of wait states needs to be chosen so that block RAMs have time to respond to a request. The present invention also involves an algorithm that allows users to select the optimal combination of wait states and associated address depth.

In an embodiment of the present invention, the number of wait states and/or the number of address lines may be set prior to configuration of a FPGA. In another embodiment of the present invention, one or both of these two parameters may be set by programming instructions of the processor core.

The memory system of the present invention may also be applied to a data processing system having separate instruction and data sides. In this system, an instruction memory controller is associated with block RAMs used for storing instructions and a data memory controller is associated with block RAMs used for storing data. In one embodiment of the present invention, the instruction and data block RAMs can be physically the same. In this case, it may be desirable to use memory management unit (MMU) schemes in general, for memory protection.

The above summary of the present invention is not intended to describe each disclosed embodiment of the present invention. The figures and detailed description that follow provide additional example embodiments and aspects of the present invention.

BRIEF DESCRIPTION OF THE DRAWINGS

The present invention is illustrated by way of example, and not by way of limitation, in the detailed description and the following figures, in which like reference numerals refer to similar elements.

FIG. 7 is a schematic diagram of a data processing system of the present invention having separate instruction and data sides.

DETAILED DESCRIPTION OF THE INVENTION

The present invention relates to constructing a data processing system using a programmable IC. In the following description, numerous specific details are set forth in order to provide a more thorough understanding of the present invention. However, it will be apparent to one skilled in the art that the present invention may be practiced without these specific details. In other instances, well-known features have not been described in detail in order to avoid obscuring the present invention.

Figure 1:
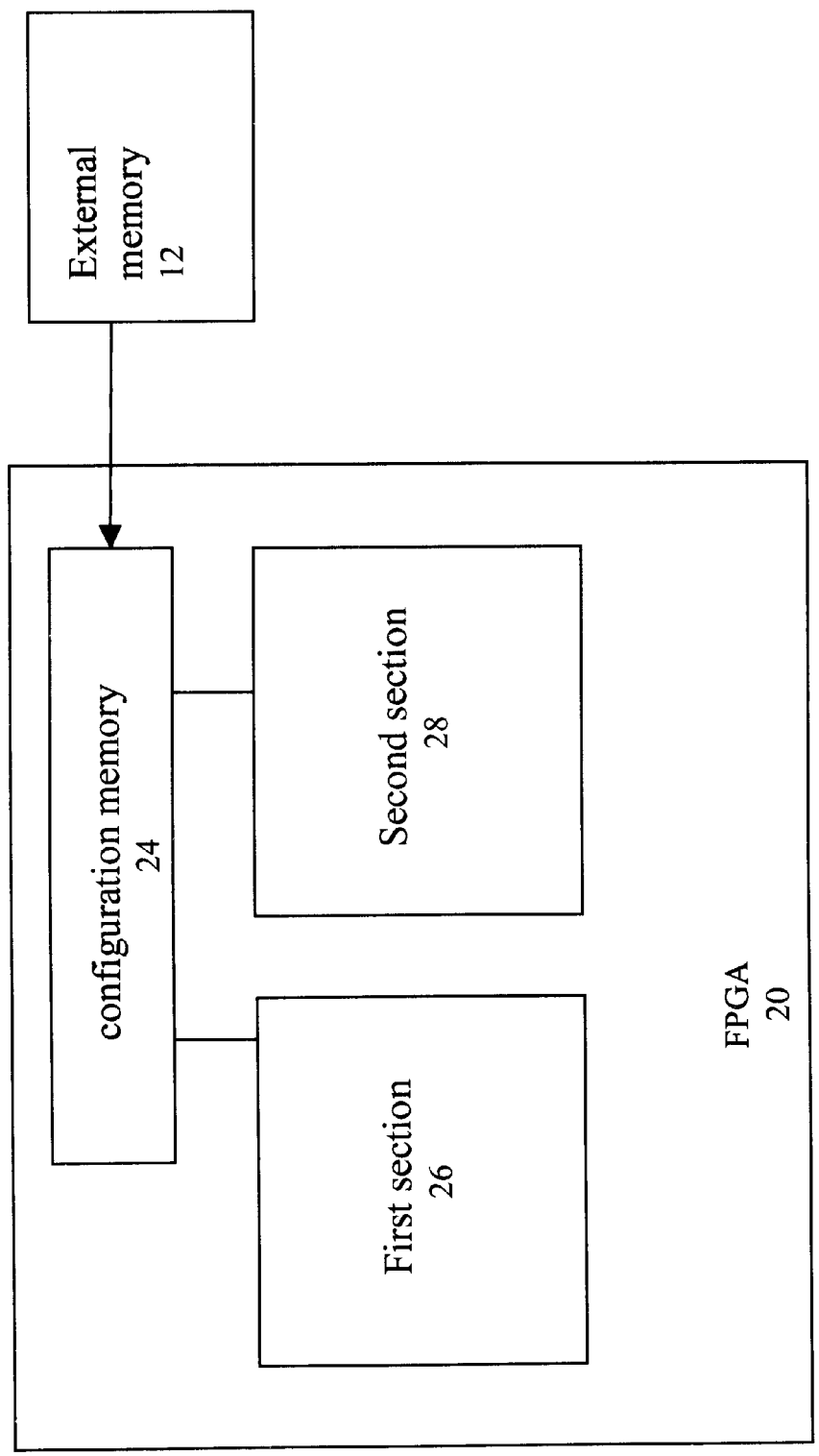
FIG. 1 is a block diagram showing a FPGA system of the present invention.

FIG. 1 is a block diagram showing a system containing a FPGA 20 and an associated external memory 12. FPGA 20 comprises a configuration memory 24 consisting of a plurality of bits. Each configuration bit defines the state of a static memory cell that controls a portion of the FPGA, such as a function lookup table bit, a multiplexer input, or an interconnect pass transistor. Configuration is the process of loading design-specific data to define the functional operation of the internal blocks and their interconnection, by storing these values into configuration memory. FPGA 20 further comprises a first section 26 that can be configured, using bits in configuration memory 24, as a data processing system of the present invention. The data processing system contains a processor core, a configurable memory controller, one or more block RAMs, and other auxiliary components. FPGA 20 optionally contains a second section 28 that can be configured, using bits in configuration memory 24, to perform other logic or memory functions. An example of a FPGA is the Virtex™ FPGA from Xilinx, Inc., assignee of the present invention. The Virtex™ FPGA is described in the Xilinx data books ("The Programmable Logic Data Book 1999" and "The Programmable Logic Data Book 2000"), which are incorporated herein by reference. Portions of the Virtex architecture are described by Young et. al in U.S. Pat. No. 5,914,616 issued Jun. 22, 1999. This patent is also incorporated herein by reference. Note that more advanced and higher capacity FPGAs may be used in the present invention.

When FPGA 20 is powered up, it receives configuration bits from external memory 12. The bits in configuration memory 24 are set accordingly. A user may change the configuration of FPGA 20 by changing the data in external memory 12. As explained below, the present invention can be used to optimize the design of the data processing system in FPGA 20.

Figure 2:
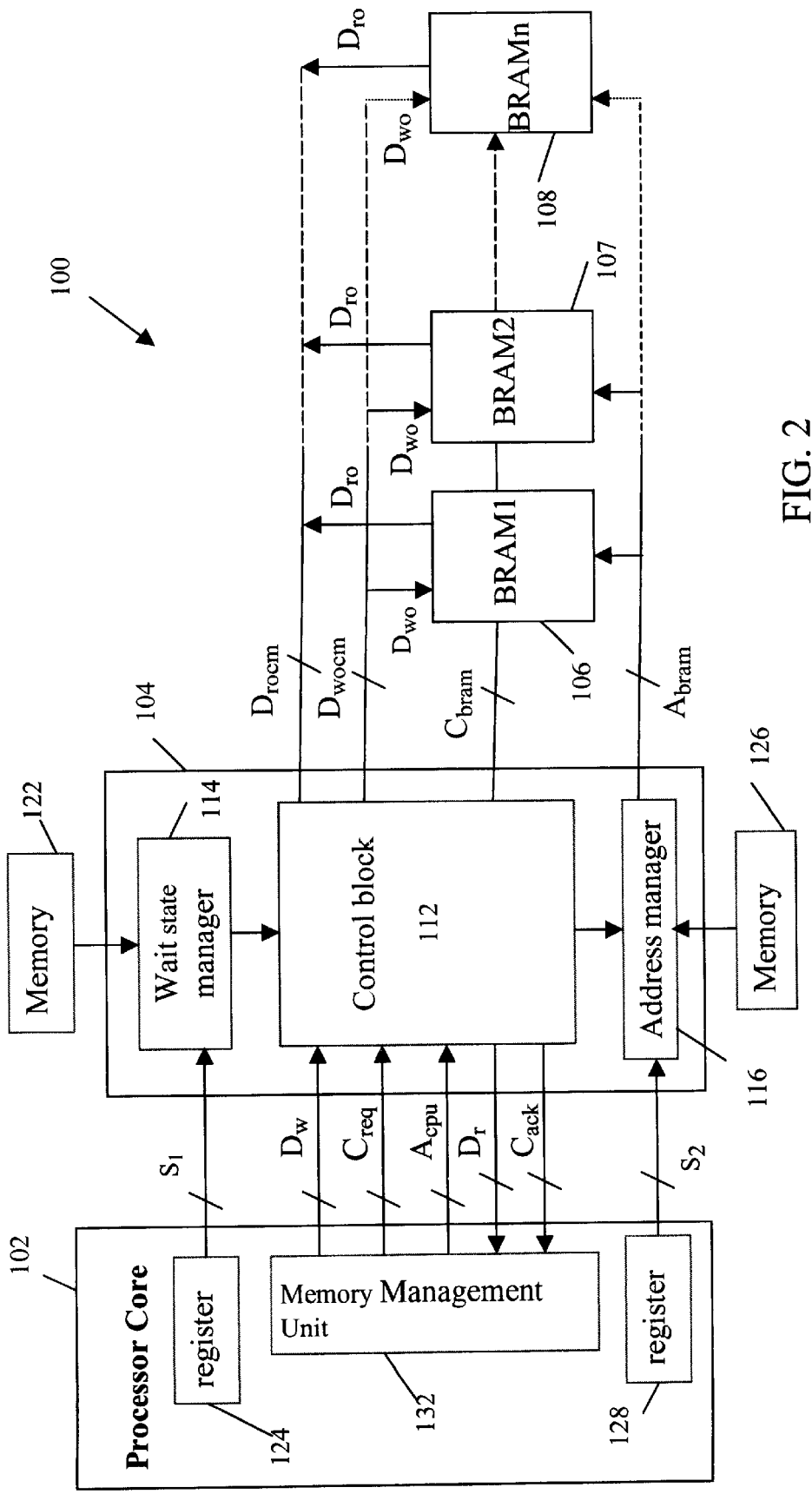
FIG. 2 is a schematic diagram showing a data processing system of the present invention that is implemented on a FPGA.

FIG. 2 is a schematic diagram showing a data processing system 100 of the present invention that is implemented on a FPGA (such as FPGA 20). System 100 comprises a processor core 102, a configurable memory controller 104, and one or more block RAMs, such as BRAMs 106–108, controlled by memory controller 104. Controller 104 comprises a control block 112 that interfaces with processor core 102 and BRAMS 106–108, a wait state manager 114 that directs control block 112 to generate wait states in accordance with user requirements, and an address manager 116 that sets up the address depth of the block RAMs in accordance with user requirements.

Wait state manager 114 accepts inputs from a register 124 inside processor core 102 (via a bus labeled $S_1$) and a memory 122 in the FPGA. Data in memory 122 and register 124 is determined by user requirements, as explained in more detail below. It should be noted that memory 122 may comprise one or more memory cells, depending on the values that need to be stored in memory 122. Wait state manager 114 is connected to control block 112, and directs block 112 to generate wait states corresponding to the data in register 124 or memory 122. Detailed structures of wait state manager 114 and control block 112 will be described below. Because the number of wait states affects the performance of data processing system 100, this is a factor that needs to be considered in the design of memory controller 104.

Address controller 116 accepts inputs from a memory 126 of the FPGA and a register 128 inside processor core 102 (via a bus labeled $S_2$) Data in memory 126 and register 128 is determined by user requirements, as explained in more detail below. It should be noted that memory 122 may comprise one or more memory cells, depending on the maximum number of address lines in the memory system. Address controller 116 accepts address lines from control block 112 and selects all or some of the address lines for use to address the block RAMs. This feature allows a user to select the optimal size and address depth of the block RAMS for use by processor core 102. The remaining block RAMs can be used for other purposes in the FPGA.

Control block 112 preferably interfaces with a memory management unit 132 of processor core 102. Memory management unit 132 sends out a read address for data load and instruction fetch operations. It also sends out a write address for data to be written into memory. Memory management unit 132 also generates and receives appropriate control signals from control block 112. Block 112 accepts a write data bus $D_w$, a control signal bus $C_{req}$ and an address bus $A_{cpu}$ from memory management unit 132. It drives a read data bus $D_r$ and a control signal bus $C_{ack}$ to memory management unit 132 of processor core 102. Control block 112 also delivers data to a write data bus $D_{wocm}$ and controls signals to a control signal bus $C_{bram}$ of block RAMs 106–108. Control block 112 receives a read data bus $D_{rocm}$ from block RAMs 106–108.

Figure 3:
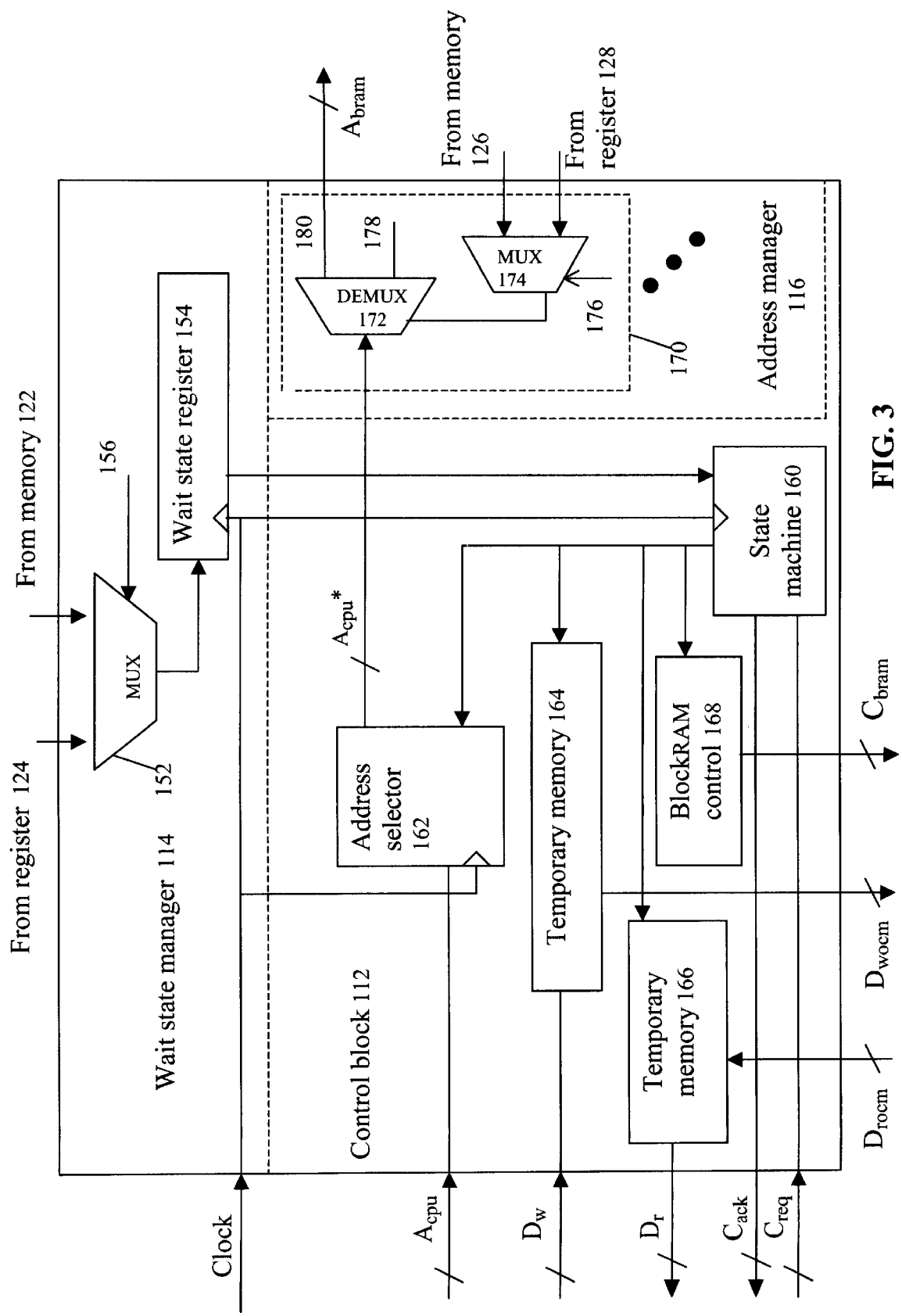
FIG. 3 is a block diagram of a user configurable on-chip memory controller of the present invention.

Additional details of user configurable memory controller 104 are shown in FIG. 3. FIG. 3 is logically divided into wait state manager 114, control block 112 and address manager 116 in a similar manner as FIG. 2. Wait state manager 114 comprises a multiplexer 152 and a wait state register 154. Wait state register 154 is used to store a value representing the number of wait states in memory access. This information is fed to a state machine 160 inside control block 112, which generates the wait states accordingly. Multiplexer 152 accepts a select signal 156 that selects one of the two inputs to couple to wait state register 154 (i.e., either from register 124 or memory 122). Because data in register 124 and memory 122 is determined by a user, the number of wait states is user configurable. Signal 156 is controlled by FPGA configuration logic such that during FPGA power up the data from memory 122 is loaded into wait state register 154. After the FPGA is configured, signal 156 may relinquish control of wait state register 154 to register 124. In this way, users can overwrite previously loaded information in wait state register 154 if there is a need to do so.

One aspect of the present invention is that the number of wait states can be set either via hardware or software. In the present invention, memory 122 is designed to be loaded prior to FPGA configuration and the data therein used to configure memory controller 104. This is a hardware method of setting the wait states. After configuration, the number of wait states cannot be changed by hardware. On the other hand, register 124 can be programmed via instructions of processor core 102. Thus, this is a software method of setting the wait states. The value of register 124, and thus the number of wait states, may be changed repeatedly anytime after configuration.

Control block 112 comprises an address selector 162. It accepts the address bus $A_{cpu}$ (from memory management unit 132) and selects some of the address lines to form a new bus $A_{cpu}^*$ for coupling to address manager 116. The number of lines in bus $A_{cpu}^*$ can be any number between 1 and the number of address lines in bus $A_{cpu}$. In one embodiment of the present invention, $A_{cpu}$ has 30 lines and $A_{cpu}^*$ has 16 lines. It should be easy for persons skilled in the art to design address selector 162. Note that the number of lines in bus $A_{cpu}^*$ is not user configurable because the design of address selector 162 is predetermined. Further note that if the number of lines in buses $A_{cpu}$ and $A_{cpu}^*$ is the same, address selector 162 may be omitted in control block 112. As explained in more detail below, the number of address lines may be further reduced by address manager 116. This reduction is user configurable.

Control block 112 may be comprising of a temporary memory 164 for temporarily storing data received from bus $D_w$ prior to sending the same to bus $D_{wocm}$. If there is no need to service read operations during write operations, temporary memory 164 may not be needed. Control block 112 may also comprise of a memory 166 for temporarily storing data received from a block RAM through bus $D_{rocm}$ prior to sending the same to bus $D_r$. A block RAM control block 168 is used to generate signals in control signal bus $C_{bram}$. As an example, it may comprise logic to enable reading/writing of the block RAMs. The design of block RAM control block 168 depends on the specification of the block RAMs used, and should be easy for persons skilled in the art to do so.

State machine 160 is used to synchronize various signals and activities of address selector 162, temporary memory 164, temporary memory 166 and block RAM control block 168. As an example, it accepts control signal bus $C_{req}$ (requesting read, write or abort operations) and generates control signal bus $C_{ack}$ regarding the status of data transfer (read, write acknowledge or abort). The design of state machine 160 depends on the specification of processor core 102 and the block RAMs, together with the value in wait state register 154. It should be easy for persons skilled in the art to design state machine 160 using these information.

Address manager 116 accepts bus $A_{cpu}^*$ and generates the block RAM bus $A_{bram}$ in accordance with data in either memory 126 or register 128. The number of address lines in bus $A_{bram}$ is equal to or less than the number of address lines in bus $A_{cpu}^*$. Address manager 116 comprises a plurality of address line deactivation units, one of which is shown as unit 170 in FIG. 3. Each unit may deactivate an address line of bus $A_{cpu}^*$. Unit 170 comprise a demultiplexer 172 that accepts as input an address line of bus $A_{cpu}^*$. One of the two outputs of demultiplexer 172 (e.g., output 180) is a single address line of the block RAM address bus $A_{bram}$. The other output of demultiplexer 172 (e.g., output 178) is not used. If the input of demultiplexer 172 is connected to output 180, the address line is activated. On the other hand, if the input of demultiplexer 172 is connected to output 178, the address line is deactivated. Whether output 180 is deactivated is controlled by another multiplexer 174. One input of multiplexer 174 is a bit of memory 126 and another input is a bit of register 128. A select signal is used to select whether the bit of memory 126 or register 128 is coupled to demultiplexer 174. As a result, whether an address line of bus $A_{cpu}^*$ is deactivated is controlled by either a bit of memory 126 or register 128. By using a plurality of address line deactivation units, it is possible to deactivate some of the address lines of bus $A_{cpu}^*$, thereby reducing the number of address lines of the block RAM address bus $A_{bram}$. Signal 176 is controlled by FPGA configuration logic such that during FPGA power up, the data from memory 126 is loaded into demultiplexer 172 select line. After the FPGA is configured, signal 176 will relinquish control so that register 128 can affect the deactivation. The demultiplexer block is used as a generic logic representation only. It should be noted that, any combination of logic gates can be used to achieve the same result.

It can be seen from the above that the bits of either memory 126 or register 128 can be used to determine the number of address lines in bus $A_{bram}$. One aspect of the present invention is that the number of address lines of the block RAM address bus can be set either via hardware or software. In the present invention, memory 126 is designed to be load prior to FPGA configuration and the data therein used to configure address manager 116. This is a hardware method of setting the number of address lines. On the other hand, register 128 can be programmed via instructions of processor core 102. Thus, this is a software method of setting the number of address lines.

Memory controller 104 accepts a clock signal (Clock). This signal is used to synchronize the timing of wait state register 154, state machine 160 and address selector 162.

Figure 4:
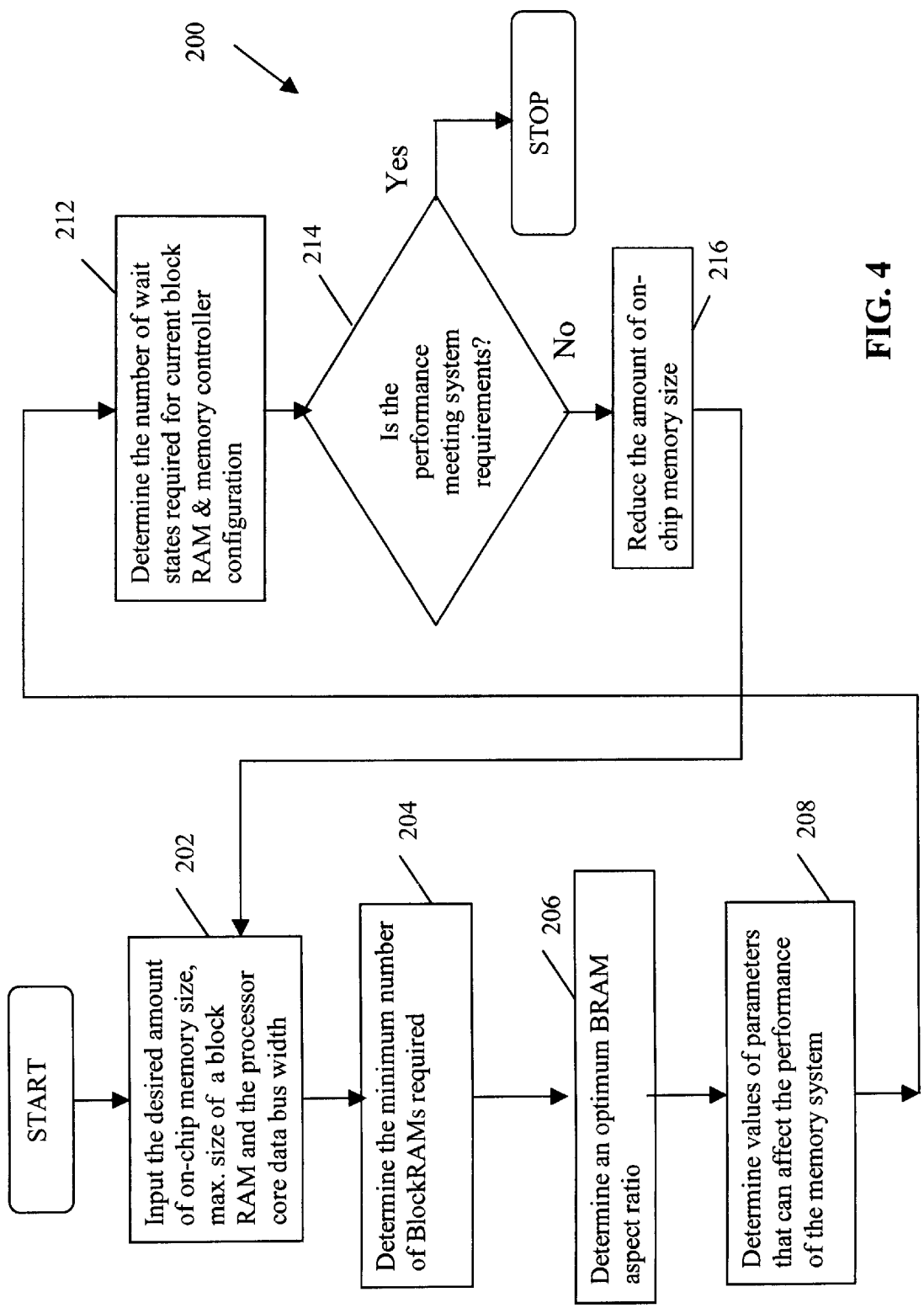
FIG. 4 is a flow chart of an algorithm of the present invention to select sizes of block RAMs and associated wait states of the on-chip memory controller of the present invention.

In order to allow a user of a FPGA to more efficiently design a data processing system of the present invention, an algorithm that can automate some of the design considerations is disclosed. FIG. 4 shows a flow chart 200 of such an algorithm. In step 202, a user determines the amount of block RAMs used by the data processing system based on his/her design criteria (designated in the formulas below by the symbol "S"). The user also enters the processor core data bus width ("$D_u$") and the maximum size of a block RAM in the FPGA ("K"). The parameter $D_u$ depends on the design of the processor core and the parameter K depends on the architecture of the FPGA. These serve as the inputs to flow chart 200. In step 204, the minimum number ("N") of block RAMs needed to meet the requirement is determined using the following formula:

$$N=S/K.$$

In step 206, the address depth ("$AD_o$") and data bus width ("$D_o$") of the block RAM are calculated. This provides the optimal aspect ratio of the block RAM. The address depth is given by the following formula:

$$AD_o = S/N;$$

and the data bus width for the block RAMs is determined by the following formula:

$$D_o = D_u/N.$$

Methods for configuration block RAMs to achieve a predetermined aspect ratio have been disclosed in the above mentioned U.S. Pat. No. 5,933,023.

An example is now provided to illustrate the above equations. It is assumed that the processor core data bus width ($D_u$) is 32 bits, the size of on-chip memory required (S) is 8 Kbytes, and the maximum size of a block RAM (K) is 16 Kilobits. Applying these numbers to the above formulas, one gets the following results:

$$N = S/K = 4;$$

$$D_o = D_u/N = 8; \text{ and}$$

$$AD_o = S/N = 2 \text{ Kbytes.}$$

The number of address lines in the block RAM address bus $A_{bram}$ is given by $\log_2(AD_o) = 11$. The aspect ratio is 2K×8. The total number of on-chip memory can be verified to be 4×(2K×8)=8 Kbytes, which is the desired value.

Once the above calculation is completed, the values of the parameters that may affect the performance of the memory system of the present invention can be determined either by measuring the appropriate timings or calculating from specifications listed in appropriate data books (step 208). In one embodiment of the present invention, the performance is affected by:

the clock period of the processor core ("$CPU_{clk}$");
the address routing delay from memory controller 104 to the farthest block RAM in the FPGA ("$T_{ra}$");
the address setup time required for a block RAM ($T_{sa}$) the block RAM access time ("$B_{acc}$");
the data routing delay from the farthest block RAM in FPGA back to the processor core ("$T_{rd}$");
the data setup time required for the processor core ("$T_{sd}$"); and
the address delay through memory controller 104 in order to latch the address from the processor core ("$T_d$").

Using these parameters, it is possible to determine the number of wait states required for this choice of block RAM and memory controller configuration (step 212). The number of wait states (W) is given by:

$$W = R\,[(T_{ra}+T_{sa}+B_{acc}+T_{rd}+T_{sd}+T_d)/CPU_{clk}]$$

where R stands for a rounding operation. The operation R takes the decimal result to the next higher integer so that W is an integer value and meets the performance requirement.

In step 214, the performance is evaluated by the user to see if it meets his/her requirements. If the answer is negative, the number of block RAMs used to serve the processor core needs to be reduced (step 216). This is because the delays between the processor core and the farthest block RAM increases with the number of block RAMs. Flow chart 200 then branches back to step 202 to re-evaluate the performance of a new set of design values. If the answer of step 214 is positive, the result is accepted and the algorithm terminates.

An example is provided to illustrate the above calculation. It is assumed that $CPU_{clk}$=5 ns (i.e., 200 MHz);
$T_{ra}$=1 ns;
$T_{sa}$=0.5 ns;
$B_{acc}$=2.5 ns;
$T_{rd}$=3 ns;
$T_{sd}$=2.5 ns; and
$T_d$=2.5 ns.

Using these numbers,

W=R[12 ns/5 ns]=R[2.4]
=3 wait states.

Figure 5:
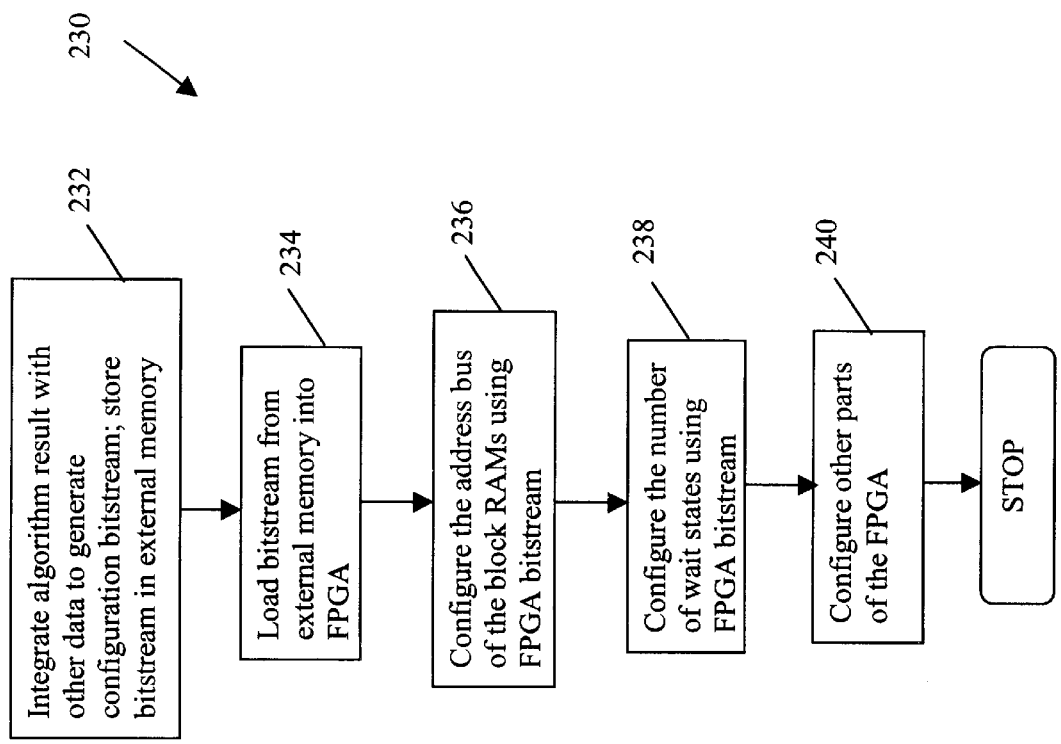
FIG. 5 is a flow chart showing the use of the result of flow chart in FIG. 4 to construct a data processing system of the present invention.

After the design is completed, the result is used to configure a FPGA. FIG. 5 shows a flow chart 230 of the steps used in setting up the data processing system of the present invention. In step 232, the result of the algorithm 200 is integrated with other information (e.g., the structure of the processor core and section 28 of FIG. 1) to generate configuration bits for a FPGA. The configuration bits are saved in an external memory. When the FPGA is powered up, the configuration bits in the external memory is loaded into the FPGA (step 234). In step 236, the FPGA bitstream is used to configure memory 126 (affecting the number of address lines of the block RAMs). In step 238, the FPGA bitstream is used to configure memory 122 (affecting the number of wait states). In step 240, the bitstream is used to configure the other parts of the FPGA. Flow chart 230 then terminates. Note that the orders of steps 236, 238 and 240 may be changed without affecting the present invention.

Figure 6:
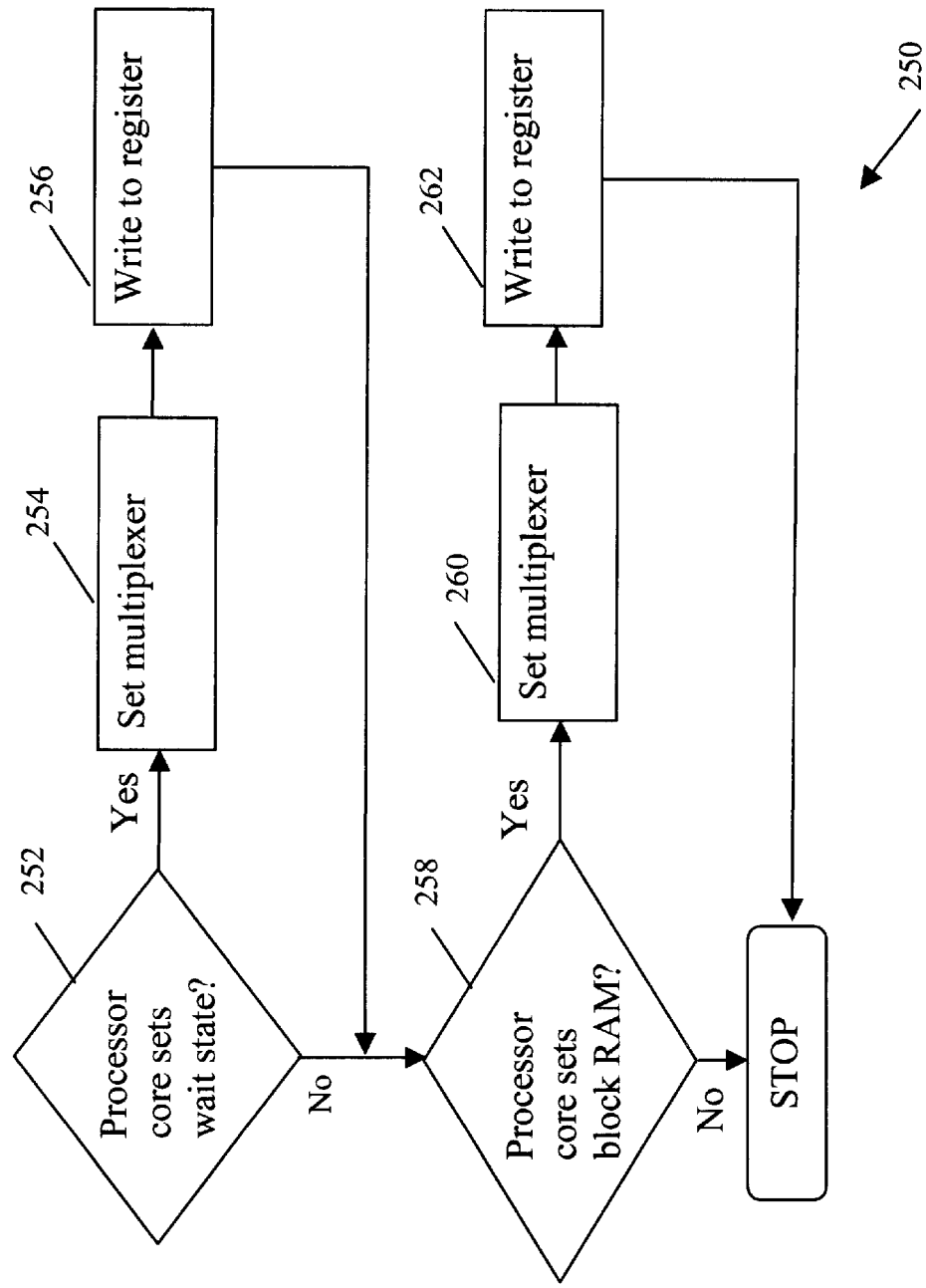
FIG. 6 is a flow chart showing the use of a processor core to configure the memory controller of the present invention.

A method to use the processor core to configure memory controller 104 in a FPGA is now described using a flow chart 250 of FIG. 6. In step 252, the user decides whether it is desirable to use the processor core to set the number of wait states. If the answer is negative, a step 258 (described below) is performed. If the answer is positive, multiplexer 152 in wait state manager 114 is set to couple register 124 of processor core 102 to wait state register 154 (step 254). In step 256, an appropriate value is written into register 124 using programming instructions of processor core 102. Flow chart 250 then branches to step 238.

In step 258, the user decides whether it is desirable to use the processor core to set the status of address manager 116. If the answer is negative, flow chart 250 terminates. If the answer is positive, multiplexer 174 in address manager 116 is set to couple register 128 of processor core 102 to multiplexer 172 (step 260). In step 262, an appropriate value is written into register 128 using the programming instructions of processor core 102. Flow chart 250 then terminates.

In another embodiment of the present invention, the block RAMs can be configured as a dual port memory. In this case, the contents of the block RAMs can be accessible to processor core 102 and other parts of the FPGA (such as second section 28 in FIG. 1).

The memory system of the present invention can be extended to a data processing system having separate instruction and data sides. In the present invention, a separate user configurable memory controller is used for each side, as shown in the data processing system 300 of FIG. 7. System 300 comprises a processor core 302 that has a separate data side 304 and instruction side 306. Data side 304 comprises a memory management unit 344 and two registers 322 and 324. These two registers serve similar functions as registers 124 and 128 of FIG. 2. Memory management unit 344 further contains a translation lookaside buffer ("TLB") 348. Instruction side 306 comprises a memory management unit 346 and two registers 326 and 328. These two registers serve similar functions as registers 124 and 128 of FIG. 2. Memory management unit 346 further contains a TLB 350.

Data processing system 300 comprises a data side memory controller 308 and an instruction side memory controller 310. The structures of these two controllers are substantially the same as that of memory controller 104, except that data side memory controller 308 contains a base address register and comparator 340 and instruction side memory controller 310 contains a base address register and comparator 342. These two base address registers and comparators are used for aliasing. Data side controller 308 is associated with two memories 332 and 334. These two memories serve similar functions as memory 122 and 126 of FIG. 2. Instruction side controller 310 is associated with two memories 336 and 338. These two memories serve similar functions as memory 124 and 128 of FIG. 2.

Data processing system 300 comprises a bank of block RAMs 312. A portion 352 of it is used for data, another portion is used for instruction, and the rest 346 may be used for other purposes. Portions 352, 354, and 356 may have different address depths and memory sizes.

Flow chart 200 can be used to calculate the performance of data side memory controller 308 and instruction side memory controller 310. Note that wait states of the data and instruction sides may be different because their corresponding memory controllers each contains its own wait state register.

In one embodiment of the present invention, block RAM portions 352 and 354 can be physically the same (i.e., their base addresses are the same). This would not cause confusion if processor core 302 segregates instruction and data references to the instruction memory controller 310 and data memory controller 308, respectively. This design has the downside of not being able to provide separate protection for the data and instruction memory blocks. For example, because data memory 332 must be readable and writable, the instruction memory 338 address range is mapped as being writable. This is not generally desirable because writing to instruction address space cannot be detected.

One method to solve this problem is to treat the overlapping address as if they are at different addresses using aliasing. For example, with base addresses both set to 8'h00, the instruction memory could be treated as being at address 32'h00800000 and the data memory could be treated as being at address 32h'00000000. Base address registers and comparators 340 and 342 are used to perform such aliasing, The mechanism for loading these two components is identical to that for loading the wait state register, as described above. While the instruction and data memory controllers are still in the same address region, in contrast with the previous method, this allows the instruction and data memory controllers to use TLB mappings which give them separate protection. TLB protection can ensure that any aliased references are detected. For example, mapping the instruction memory controller as execute-only and data memory controller as non-execute can prevent inadvertent instruction reference. It is important to note that in a scenario where separate TLB exist for each instruction and data, address separation is not needed.

It can be seen from the above description that a novel on-chip memory system and methods for implementing the same have been disclosed. Those having skill in the relevant arts of the invention will now perceive various modifications and additions which may be made as a result of the disclosure herein. Accordingly, all such modifications and additions are deemed to be within the scope of the invention, which is to be limited only by the appended claims and their equivalents.

What is claimed is:

1. A user configurable memory controller interfacing with a processor core and controlling one or more block RAMS, said memory controller, said processor core and said one or more block RAMs being included in a single FPGA configurable by a set of configuration bits, said processor core containing a first and a second register programmable by instructions of said processor core, said memory controller accepting a first set of address lines from said processor core, said memory controller comprising:

a wait state manager comprising:
   a multiplexer having an output, a first input, a second input and a third input, said first input accepting a first set of said configuration bits, said second input accepting data from said first register, and said third input accepting a first select signal for selectively coupling one of said first and said second inputs to said output; and
   a wait state register coupled to said output of said multiplexer of said wait state manager;
   a state machine for generating wait states for said one or more block RAMs in response to a value in said wait state register; and
an address manager comprising a plurality of units for generating a second set of address lines from said first set of address lines, said second set of address lines being coupled to said one or more block RAMs, each of said units comprising:
a demultiplexer having a first terminal accepting one of said first set of address lines, a second terminal coupled to one of said second set of address lines, and a third terminal for selectively coupling said first terminal to said second terminal in response to a second select signal; and
a multiplexer having an output, a first input, a second input and a third input, said first input accepting a second set of said configuration bits, said second input accepting data from said second register, said third input accepting a third select signal for coupling one of said first and said second inputs to said output, said output generating said second control signal.

2. The controller of claim 1 wherein at least one of said one or more block RAMs has a configurable aspect ratio, and wherein said second set of address lines is related to said aspect ratio.

3. The controller of claim 2 wherein said wait states is related to said aspect ratio.

4. The controller of claim 1 wherein said one or more blocks of RAMs has respective routing delays with respect to said controller, and wherein said wait states is related to a maximum value of said routing delays.

5. A user programmable memory controller interfacing with a processor and controlling one or more blocks of random access memory (RAM), said processor generating a first set of address lines, said controller comprising:
a user programmable address manager generating a second set of address lines from said first set of address lines, said second set of address lines having a programmable depth and being coupled to said one or more blocks of RAM; and
a user-programmable wait state manager that generates wait states related to said depth.

6. The controller of claim 5 wherein at least one of said one or more blocks of RAM has a configurable aspect ratio, and wherein said depth is related to said aspect ratio.

7. The controller of claim 5 wherein said one or more blocks of RAM has respective routing delays with respect to said controller, and wherein said wait states are related to a maximum value of said routing delays.

8. The controller of claim 5 wherein said address manager comprises:
   a plurality of logic components each having an input that accepts one of said first set of address lines and an output; and
   a set of control signals having user-programmable states for activating or deactivating said plurality of logic components.

9. The controller of claim 8 wherein at least one of said one or more blocks of RAM has a configurable aspect ratio, and wherein said states of said set of control signals is related to said aspect ratio.

10. The controller of claim 8 wherein said one or more blocks of RAM has respective routing delays with respect to said controller, and wherein said wait states are related to a maximum value of said routing delays.

11. The controller of claim 8 wherein said plurality of logic components comprise demultiplexers.

12. The controller of claim 11 wherein said address manager further comprises a plurality of multiplexers each having an output terminal that delivers a respectively one of said set of control signals to a respective one of said demultiplexers.

13. The controller of claim 12 wherein at least one of said one or more blocks of RAM has a configuration aspect ratio, and wherein said states of said set of control signals is related to said aspect ratio.

14. The controller of claim 12 wherein said one or more blocks of RAM respective routing delays with respect to said controller, and wherein said wait states are related to a maximum value of said routing delays.

15. The controller of claim 12 wherein said controller is implemented in a field programmable gate array that has configuration memory, and wherein one input to each of said plurality of multiplexers is coupled to said configuration memory of said field programmable gate array.

16. The controller of claim 12 wherein said processor is associated with a register, and wherein one input to each of said plurality of multiplexers is coupled to said register.

17. The controller of claim 16 wherein said register is programmable by software instructions of said processor.

18. The controller of claim 12 wherein said controller is implemented in a field programmable gate array having configuration memory and said processor is associated with a register, and wherein inputs to each of said plurality of multiplexers are coupled to said register and said configuration memory of said field programmable gate array.

19. The controller of claim 18 wherein said register is programmable by software instructions of said processor.

20. The controller of claim 8 wherein said address manager further comprises a plurality of multiplexers that generate said set of control signals.

21. The controller of claim 20 wherein said controller is implemented in a field programmable gate array that has configuration memory, and wherein one input to each of said plurality of multiplexers is coupled to said configuration memory of said field programmable gate array.

22. The controller of claim 20 wherein said processor is associated with a register, and wherein one input to each of said plurality of multiplexers is coupled to said register.

23. The controller of claim 22 wherein said register is programmable by software instructions of said processor.

24. The controller of claim 20 wherein said controller is implemented in a field programmable gate array having configuration memory and said processor is associated with a register, and wherein inputs to each of said plurality of multiplexers are coupled to said register and said configuration memory of said field programmable gate array.

25. The controller of claim 24 wherein said register is programmable by software instructions of said processor.

* * * * *